United States Patent

Fairbanks

[15] 3,686,380
[45] Aug. 22, 1972

[54] METHOD FOR MAKING NET STRUCTURES

[72] Inventor: Theodore H. Fairbanks, R.D. 1, Liverpool, Pa. 17045

[22] Filed: Nov. 18, 1970

[21] Appl. No.: 90,674

Related U.S. Application Data

[63] Continuation-in-part of Ser. No. 849,947, Aug. 12, 1969, Pat. No. 3,591,896.

[52] U.S. Cl. .................. 264/103, 87/12, 87/53, 156/167, 161/DIG. 6, 264/167, 264/DIG. 81
[51] Int. Cl. ........................... D04g 1/00, D02g 1/20
[58] Field of Search ............... 264/167, 103, DIG. 81; 18/12 N, 13; 161/DIG. 6; 156/167; 87/12, 53

[56] References Cited

UNITED STATES PATENTS

| | | | |
|---|---|---|---|
| 3,630,117 | 12/1971 | Guy | 264/103 |
| 3,012,275 | 12/1961 | Nalle | 264/DIG. 81 |
| 3,360,410 | 12/1967 | Romanin | 156/172 |
| 3,562,046 | 2/1971 | Guy | 156/167 |
| 3,579,729 | 5/1971 | Fairbanks | 18/12 N |
| 3,591,892 | 7/1971 | Fairbanks | 264/167 |
| 3,591,894 | 7/1971 | Fairbanks | 264/167 |
| 3,331,903 | 7/1967 | Mine | 264/DIG. 81 |
| 3,518,720 | 7/1970 | Fairbanks | 264/DIG. 81 |
| 3,525,785 | 8/1970 | Fairbanks | 264/DIG. 81 |
| 3,551,236 | 12/1970 | Fairbanks | 264/DIG. 81 |

FOREIGN PATENTS OR APPLICATIONS

| | | | |
|---|---|---|---|
| 380,369 | 9/1969 | Switzerland | 264/DIG. 81 |

*Primary Examiner*—Jay H. Woo
*Attorney*—Thomas R. O'Malley, George F. Mueller and Eugene G. Horsky

[57] ABSTRACT

A method of making a net-like structure wherein groups of strands of paired groups of strands are periodically shifted to provide different pairs of such groups. Alternately with such shifting, each paired group of strands is rotated about an axis between the groups of such pair with the strand in each such group nearest such axis being rotated 180° while the remaining strands in each such group are turned through 360°.

6 Claims, 4 Drawing Figures

PATENTED AUG 22 1972 3,686,380

METHOD FOR MAKING NET STRUCTURES

This application is a continuation-in-part of my application Ser. No. 849,947, filed Aug. 12, 1969, now U.S. Pat. No. 3,591,894.

The present invention relates to a method for making net-like structures.

In U.S. Pat. No. 3,331,903 there is disclosed a method and apparatus for making a net from plastic material by extruding a plurality of pairs of monofilaments of plastic material in such a manner that the filaments in each pair are spaced from each other in a first direction and the pairs of filaments are spaced from each other a given distance in a second direction. The monofilaments of each pair of filaments are revolved, at the moment of their extrusion and before being solidified, about an axis extending between the filaments of each such pair of filaments so as to twist the filaments of each pair together and to thus integrally connect the filaments. One of the filaments of each pair of filaments is then moved in a second direction a distance equal to the spacing between pairs of filaments while continuing the extrusion of the filaments, after which pairs of filaments are again revolved as heretofore described. By continuously repeating the above steps and setting of the extruded filaments of plastic material, a net-like structure is provided.

In my U.S. Pat. application entitled METHOD FOR CONTINUOUSLY EXTRUDING NET-LIKE STRUCTURES, Ser. No. 825,210, filed May 16, 1969 now U.S. Pat. No. 3,627,863, there is disclosed a method of making net-like structures of woven or braided monofilaments using an apparatus similar to that described in U.S. Pat. No. 3,331,903.

Net-like structures produced in accordance with the method described in U.S. Pat. No. 3,331,903 are rather stiff and, in general, do not possess a desired bulk or esthetic appeal which would encourage their use as replacements for conventional woven fabrics. Net-like structures formed by the method disclosed in the above-noted U.S. Pat. No. 3,627,863 also lack bulk and, although such structures have unbonded interlaced strands the strands are free to shift relative to each other when subjected to loads, thus causing distortion of the mesh openings thereof. Accordingly, a primary object of this invention is the provision of a new or improved and more satisfactory method for making net-like structures.

Another object of this invention is to provide a method for making a net-like structure which possesses better strength and/or bulk than conventional net-like structures and is decorative in appearance.

Still another object is a method for making a net-like structure having unbonded interlaced strands which are stabilized against excessive shifting relative to each other.

A further object is the provision of a new or improved extrusion method for making net-like structures having multiple strands extending between adjacent strand junctions.

A still further object is the provision of a method for continuously extruding net-like structures which are formed of strands and have junctions at each of which strands are disposed in crossing relationship with each other and are entwined by other strands.

A still further object is to provide a method for making net-like structures formed of a pair of webs having strands and strand junctions in which the strands of one web are entwined about crossing strands of the other web and are also interwoven with strands of such other web.

These and other objects are accomplished in accordance with the present invention by a method in which strands are manipulated to provide a net-like structure including strands and having strand junctions at each of which strands are disposed in crossing relationship with each other and are entwined by other strands. The strands employed may be preformed. Alternately, and as hereafter described in detail, these strands may be formed continuously and concomitantly with their manipulation into a net-like structure.

In accordance with one preferred mode of practicing the method of the present invention, a plurality of separate groups of spaced streams of strand-forming material are continuously extruded, with the groups being arranged in pairs and the pairs of groups being spaced from each other a given distance along a common plane which extends between the groups of each pair of groups. Each pair of groups of streams are revolved about the axis which extends between the respective groups of each such pair of groups with at least the stream in each such group which is nearest to its axis of revolution, but less than all of the streams of each such group, being moved through an angle of 180° while the remainder of the streams of each such group are moved through an angle of 360°. The groups of streams of each pair of groups are then moved relatively in a direction parallel to the common plane to rearrange at least certain of the groups of streams into pairs with other groups. The streams are set into strands concomitantly with the extrusion thereof and by continuously repeating the above sequence of movements, simultaneously with the extrusion of the groups of streams of strand-forming material, net-like structures having desired patterns of strands and strand junctions are provided.

As indicated by the term "group," at least two streams are included in each group. The respective groups of streams of each pair of groups may include a like or different number of streams. The maximum number of strands in each group of streams will be controlled only by limitations imposed by the apparatus employed in the practice of the method and the ability to maintain the streams of each group in spaced relationship during the extrusion and setting thereof. The spacing between streams in the respective groups and the spacing of such streams from the axis extending between the groups of streams of each respective pair of groups may differ without adversely affecting the results obtained in the practice of the method of the present invention.

Relative movement of the groups of each pair of groups may be effected, for example, by moving the groups of streams along one side of the common plane while the groups of streams along the opposite side of the common plane are held stationary. Alternatively, the groups of streams along opposite sides of the common plane may be moved in the same direction, but at different rates of speed, or in opposite directions relative to such common plane. When moved, the groups of streams along the respective sides of the common plane are moved in unison and at the same rate of speed. The rate at which relative movement of the groups of streams is effected may be changed periodically or randomly during the method to vary the pattern of strands in the finished net-like structure.

Preferably, all of the streams in the pairs of groups are moved in unison, at constant rates of speed, and in the same direction when such pairs of groups are revolved. That is, during any particular revolution of the respective pairs of groups, the streams thereof will all move in either a clockwise or counterclockwise direction about an axis between the groups of streams of each such pair of groups. Desirably, the streams of each paired group of streams which are revolved through an angle of only 180° and the streams of such groups which are revolved through an angle of 360° commence and terminate their turning movements together.

The above-described preferred method may be varied, for example, by having the streams of the respective paired groups which are being revolved through an angle of only 180° move at a different rate of speed than those streams of such groups which are being revolved through an angle of 360°. Although the streams of the respective groups which are to be revolved through a like angle must be moved in unison, the rate at which such streams are moved may be varied during the revolution thereof. Further, the streams of the respective groups which have been described as being revolved through an angle of 360° may be further turned through an angle of 180° or multiple thereof so that the strands formed from such streams are not merely interlaced with other strands but are twisted about such other strands in the finished net-like structure.

Essential for the satisfactory practice of the method of the present invention is that the direction of revolution of the pairs of groups of streams and the direction of relative movement of the groups in the pairs of groups be reversed after the respective alternate movement has been completed. Stated differently, the groups along one or both sides of the common plane which are moved parallel to the common plane are reversed in direction after each revolution of pairs of groups of streams, and the direction of revolution of pairs of groups of streams are also reversed after each movement of groups of streams parallel to the common plane. For example, in the instance where pairs of groups of streams have been revolved in a clockwise direction and the groups along only one side of the common plane have been moved to the left to provide for relative movement between the groups of the pairs of groups of streams, the rearranged pairs of groups of streams would now be revolved in a counterclockwise direction and would be followed by the groups along the one side of the common plane being moved to the right.

By following the above procedure, the resulting net-like structure includes strands which are crossed or interlaced with each other into a web having a plain weave pattern, and strands which define a second web in which the strands are interlinked with each other and are both interlaced with strands of the woven web and entwined about the same in their areas of crossing. If the streams from which the strands in the net-like structure is formed are only partially set and still tacky before contact therebetween or set only after they have contacted, the interlaced and interlinked strands will be bonded together at their locations of crossing so that strong, integral junctions will be provided. On the other hand, if the streams forming the strands of the net-like structure are set, at least on the surfaces thereof, prior to any contact therebetween, each strand remains independent of the others at their locations of crossing. In both instances, however, the interlinked strands will serve to at least partially stabilize and, in effect, lock strands of the woven web against movement in certain directions.

More particularly, when revolving the pairs of groups of streams, the streams of the respective groups which are moved through an angle of only 180°, alternately with the movement thereof in directions parallel to the common plane, maintain the same direction of travel parallel to the common plane. In other words, a stream of a paired group of streams which was moved parallel to the common plane in a leftward direction will continue to be moved in the same leftward direction after the group which includes such stream has been revolved through an angle of only 180°. On the other hand, the streams of the respective groups of streams which are revolved through an angle of 360° are returned to their original positions and will either remain stationary or will be moved in a direction opposite to their prior movement when relative movements between the groups is effected. Thus, if groups each containing four streams are paired and two of each group are revolved through an angle of only 180° while the remaining two of each group are turned through 360°, two of the strands formed from streams in such groups will merely cross two other streams. The remaining four strands will be entwined about the crossing strands, with two extending in a clockwise direction and two in a counterclockwise direction.

The apparatus employed in the method of the present invention includes a plurality of nozzles, each being of semi-circular configuration and including a semi-cylindrical section and a mating semi-circular section. The nozzles are arranged in spaced relationship along each of the opposite sides of a common plane, with their flat sides disposed along the common plane and with the nozzles along one side of the common plane being paired with like nozzles along the opposite side of the common plane. Each of the nozzle sections includes at least one extrusion orifice to which flowable strand-forming material is delivered and from which such strand-forming material is extruded as a continuous stream and set into a strand.

Means are provided for relatively shifting the nozzles of the respective pairs of nozzles in directions parallel to the common plane to rearrange at least some of the nozzles along one side of the common plane into pairs with like nozzles along the other side of such plane. Operative alternately with the shifting means are means for revolving the semi-circular and the semi-cylindrical sections of the respective pairs of nozzles concomitantly about an axis extending centrally between such nozzles.

Relative movement between the nozzles of the respective pairs of nozzles may be effected, for example, by holding the nozzles along one side of the common plane stationary while the nozzles along the other side of such plane are reciprocated. Preferably, the nozzles along both sides of the common plane are reciprocated in 180° out-of-phase relationship, with the means for revolving the semi-circular and semi-cylindrical sections of the respective pairs of nozzles being operative alternately with each stroke of the nozzle reciprocating means. The nozzle revolving means includes means for moving the semi-circular sections of the respective pairs of nozzles through an angle of only 180° and means for moving the semi-cylindrical sections of such respective pairs of nozzles through an angle of 360° alternately with the operation of the shifting means.

As with conventional apparatus for making net-like structures, suitable means are provided for drawing the finished net-like structure away from the extrusion means itself.

The net-like structures made by the method of the present invention may be formed of any continuous preformed strands which possess the necessary flexibility for manipulation into an entwined relationship. When the net-like structure is made of strands which are formed continuously and concomitantly with their manipulation, a variety of fiber-forming materials may be employed, which are referred to by the terms "-plastic" and "strand-forming materials," including polyolefins, such as polyethylene, polypropylene, polybutylene, polystyrene, polystyrene-acrylonitrile blends, acrylonitrile butadiene-styrene blends, acrylonitrile-butadiene copolymers, polybutene, polyisobutylene, polyisoprene, and isobutylene-isoprene copolymers; halogenated olefins, such as polyfluoroethylene, polychlorofluoroethylene, polychlorofluoropropylene, polyvinyl chloride, polyvinylidene chloride, polyvinyl chloride-acetate copolymer, polyvinyl chloride-polypropylene copolymer, polychloroprene, fluoroinated ethylene-propylene copolymers, vinylidene fluoride-chlorotrifluoroethylene copolymers, and vinylidene fluoride-hexafluoropropylene copolymers; polyesters, such as polyethylene terephthalate and copolymers thereof and polycarbonate; polyamides, such as polyhexamethyl adipamide, polycaprolactam, polyhexamethylene sebacamide, poly -aminoundecanoic acid; polyvinyl acetates; chlorinated polyethers, such as, ethylacrylate-chloroethylene vinyl ether copolymer; acrylic resins, such as polyacrylonitrile, polyacrylates and methacrylates; natural rubbers; compounded silicones, polyurethanes; polyethers, such as polyformaldehyde, formaldehyde-ethylene oxide copolymers, and polytrioxane; polysulfur resins, such as polysulfones and polysulfides; water-soluble, alkali soluble, and organic solvent-soluble cellulose esters and ethers, such as cellulose nitrate, cellulose acetate, cellulose butyrate, cellulose propionate, ethyl cellulose, viscose or cellulose xanthate, cuproammonium cellulose, and carboxymethyl cellulose; glasses; metals, etc. Such materials may include various additives such as stabilizers, dyes, foaming agents, etc., if so desired.

For a greater understanding of this invention, reference is made to the following detailed description and drawing in which FIG. 1 is a front view of the apparatus employed in the practice of the method of the present invention, with a portion of such apparatus being shown in section;

Figure 1:
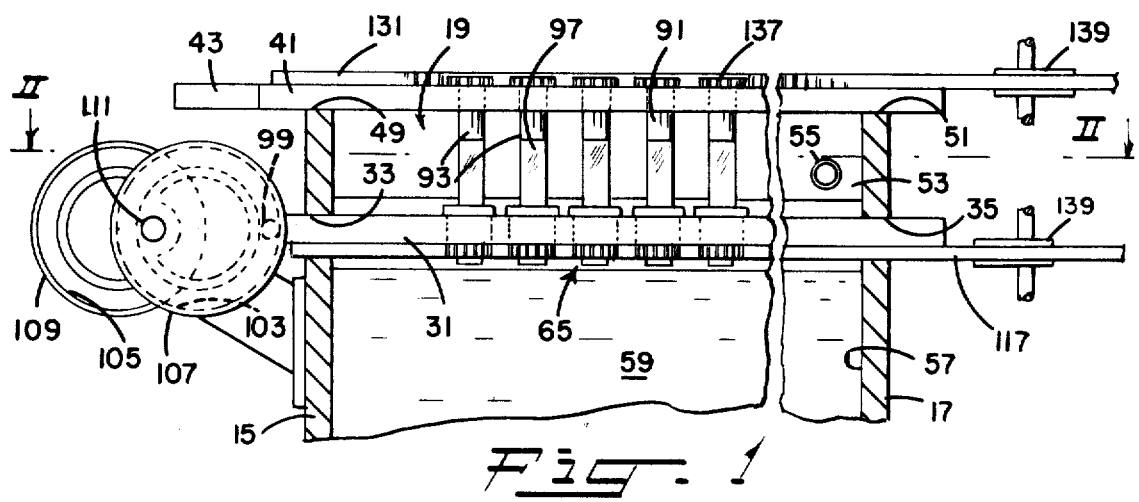

With reference to the drawing, the apparatus employed in the method of the present invention includes a pair of vertical support members 15 and 17 and a pair of channels 19 which are fixed to the upper portions of the support members 15 and 17 in laterally spaced and opposing relationship with each other. Each of the channels 19 includes a web 20, a pair of flanges 21 and 23, and a wall 25 projecting from the channel web 20 and cooperating with the adjacent flange 21 to define a slot 27. Plates 29 and 31, extending through openings 33 and 35 in the support members 15 and 17, are mounted for sliding movement along the slots 27, with their opposing edges 37 and 39, respectively, in abutting relationship.

Plates 41 and 43 are also mounted for sliding movement relative to the channels 19 and are formed with edge portions 45 of reduced thickness which are received within correspondingly spaced slots 47 formed in the channel flanges 23. The plates 41 and 43 are also disposed with their opposing longitudinal edges in abutting relationship and appropriately shaped openings 49 and 51 are formed in the support members 15 and 17, respectively, to accommodate such plates.

The support members 15 and 17, channels 19, and the pairs of plates 29 and 31 and 41 and 43 together define a closed chamber 53. A flowable strand-forming material is delivered under pressure into the chamber 53 through a conduit 55 from a suitable source, not shown. Gaskets are provided along the edges of the openings 33, 35 and 49 and 51 in the support members 15 and 17 to prevent leakage of strand-forming material during sliding movement of the plates 29, 31, 41 and 43 relative to such support members. A tank 57 is provided for containing a suitable setting liquid 59 in the area below the plates 29 and 31.

The abutting edges 37 and 39 of the plates 29 and 31 and the abutting edges of the plates 41 and 43 all lie in a common vertical plane. A series of like, equally spaced semi-circular recesses 61 and 63 are formed along the edges 37 and 39 of the plates 29 and 31, respectively. A nozzle 65 is positioned within each of the plate recesses 61 and 63 and includes a semi-cylindrical section 67 and a mating semi-circular section 69.

The nozzle sections 67 are each formed with an outer arcuate wall 71, which conforms with the plate recesses 61 and 63, an inner arcuate wall 73, flat surfaces 75, and a flange 77 at its uppermost end which projects over and rests upon the top surface of the respective plates 29 and 31. The nozzle sections 69 are each formed with an arcuate wall 79, which conforms with the arcuate wall 73 in the nozzle sections 67, a flat wall 81 and a flange 83, the latter of which extends into a recess 85 formed in the top surface of the respective nozzle sections 67.

The plates 41 and 43 are also provided with a series of like recesses 87 and 89 along the respective abutting edges, with the spacing between the recesses in such series being substantially equal to that of the recesses 61 and 63 in the plates 29 and 31. Like semi-circular members 91, which may be of solid or closed construction, are positioned within the respective recesses 87 and 89. Each such member 91 includes an arcuate wall 93, which conforms to the recesses 87 and 89, and a flat wall 95. The semi-circular sections 69 of the nozzles 65 and the members 91 are intended to move in unison with each other and thus each such nozzle section 69 is rigidly connected to an individual member 91 by a strut 97.

Means are provided for longitudinally moving or shifting corresponding plates in the pairs of plates 29 and 31 and 41 and 43 in unison at selected time intervals, as hereafter described. Of course, during such movement the flat surfaces of the respective nozzle sections and the flat surfaces of the members 91 are disposed in the common plane, as defined by the abutting surfaces of the pair of plates 29 and 31 and the pair of plates 41 and 43. Preferably, both of the plates of each such pair of plates are shifted longitudinally in opposite directions relative to each other, with corresponding plates in such two pairs of plates moving in unison.

The relative longitudinal movement between the plates 29 and 31 is effected through pins 99 and 101 which project from the respective plates 29 and 31 and ride along grooves 103 and 105 formed in opposing faces of cams 107 and 109. These cams 107 and 109 are of like construction and are fixed, in 180° out-of-phase relationship, to a shaft 111 which is supported by bearings, such as shown at 113, and is intermittently driven by suitable means, not shown. In the particular apparatus illustrated in the drawings, and as more fully described hereafter, the plates 29 and 31 are moved in opposite directions a distance substantially equal to one-half of the center-to-center spacing of the respective recesses 61 and 63 to thereby rearrange the nozzles 65 which are carried by such plates into different pairs.

Movement of the plates 29 and 31 is transmitted to the plates 41 and 43 through the struts 97 and members 91 so that corresponding plates in these two pairs of plates will move in unison with each other. If desired, a separate means may be provided for shifting the plates 41 and 43 in synchronism with the plates 29 and 31, respectively.

Alternately with the longitudinal sliding movement of the pair of plates 29 and 31 and the pair of plates 41 and 43, the respective nozzle sections 67 and 69 of aligned or paired nozzles 65 are independently revolved, with the nozzle sections 67 being turned through an arc of 360°, or further multiples of 180°, while the nozzle sections 69 are carried through an arc of only 180°. This revolving movement of the nozzle sections 67 is effected by gear racks 115 and 117 which are driven by segment gears 121 and 123 and are in meshing engagement with gear teeth 119 formed along the outer walls 71 of such sections. The channel flanges 21 are rabbeted at 125 and, with the plates 29 and 31, define guide slots for the racks 115 and 117. For reasons as hereafter described, gear teeth are omitted from along selected lengths of the opposing sides of the racks 115 and 117, as indicated at 127 and 129.

Revolving movement is likewise imparted to the nozzle sections 69 by racks 131 and 133 which mesh with semi-circular gears 135 and 137 fixed to the upper ends of the members 91. Suitable, means, not shown, are provided for maintaining the racks 131 and 133 in meshing engagement with the gears 135 and 137. The racks 131 and 133 are each driven by a separate segment gear 139, with both such gears being driven in synchronized relationship to shift the racks 131 and 133 in opposite directions relative to each other. As with the racks 115 and 117, teeth are omitted from selected lengths of each of the racks 131 and 133 for reasons as hereafter described.

For the sake of simplicity, the nozzle sections 67 and 69 are each illustrated as having a single extrusion orifice 141 and 143, respectively. It will be understood that the number of such orifices extending through the respective nozzle sections may be varied without departing from the teachings of the present invention.

Figure 2:
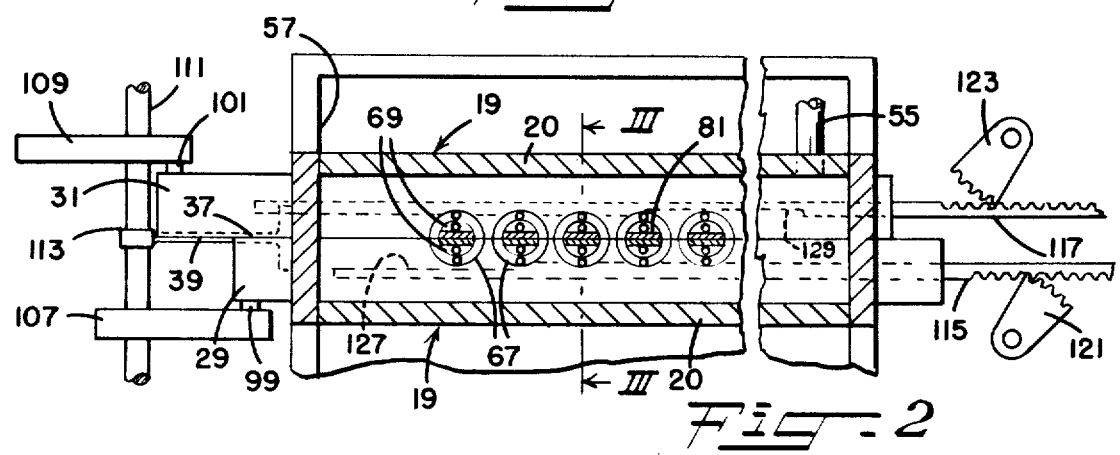
FIG. 2 is a horizontal section taken substantially along the lines II—II of FIG. 1.
Figure 3:
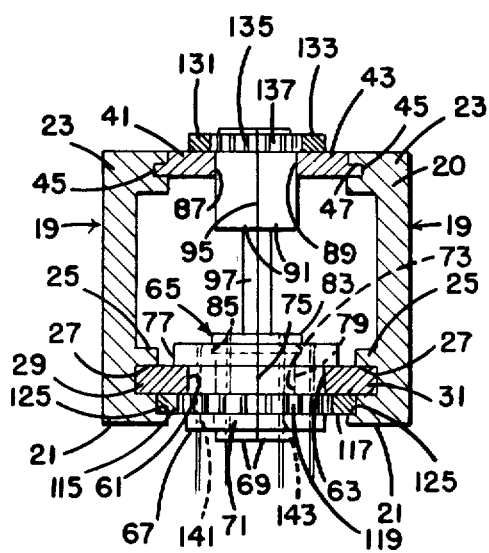
FIG. 3 is a partial vertical section taken transversely through the apparatus substantially along the line III—III of FIG. 2.

With the various elements of the apparatus in stationary starting positions as shown in FIGS. 1, 2 and 3, a flowable strand-forming material, such as molten thermoplastic material, is delivered under pressure into the chamber 53 through the conduit 55. Such flowable strand-forming material is continuously extruded from all orifices 141 and 143 in the nozzle sections 67 and 69 as streams which are set into strands in the liquid 59, which may be cool water.

The cams 107 and 109 are now operated to shift the plates 29 and 31 in opposite directions a distance equal to one-half of the center-to-center spacing of the respective plate recesses 61 and 63 to thus align nozzles 65 in the plate 29 with different nozzles 65 in the plate 31. For example, the plate 29 may be moved to the left, as viewed in FIG. 2, while the plate 31 is simultaneously moved to the right to thereby rearrange the nozzles 65 along opposite sides of the common plane, as defined by the plate edges 37 and 39, into different pairs. During this movement, streams of strand-forming material are continuously extruded from the orifices 141 and 143 of all of the nozzle sections 67 and 69, and are merely moved in unison in directions parallel to the common plane.

The members 91, being rigidly connected to the nozzle sections 69 by the struts 97, will move in unison with the nozzle sections 69 and will urge the plates 41 and 43 in the same directions as the plates 29 and 31, respectively. During the above-described stage of the method, the gear racks 115, 117, 131 and 133 are not in meshing engagement with their driving segment gears and thus such racks are free to shift with the plates 29, 31, 41 and 43, respectively.

The nozzle sections 67 and 69 of the rearranged pairs of nozzles 65 are now separately revolved. More particularly, the racks 115 and 117 are driven by the gears 121 and 123 in opposite directions relative to each other, as for example to the left and right, respectively, as viewed in FIG. 2. In this manner the nozzle sections 67 of each pair of aligned nozzles 65 are revolved in a clockwise direction. The degree to which the racks 115 and 117 are shifted must be such as to rotate the sections 67 of aligned nozzles 65 through a complete 360° circle.

Concomitantly with the revolving of the nozzle sections 67 of the paired nozzles 65, the nozzle sections 69 of such aligned nozzles 65 are revolved by shifting the racks 131 and 133 in opposite directions relative to each other by the segment gears 139. The racks 131 and 133 are shifted in the same directions as the racks 115 and 117, respectively, but only to such degree as to revolve the nozzle sections 69 through an arc of only 180°.

During the revolving of the sections of aligned nozzles 65, the nozzle sections 67 carried by the plates 29 and 31 which are not paired or aligned with like nozzle sections 67 in the opposing of such plates will lie opposite to the portions 127 and 129 of the racks 115 and 117, respectively. Since such rack portions 127 and 129 are free of gear teeth, no revolving movement will be imparted to the nozzle sections 67 which are adjacent thereto when such racks are shifted. Likewise, the members 91 which are rigidly connected to nozzle sections 69 of unpaired nozzles 65 will be disposed opposite to the portions of the racks 131 and 133 from which teeth are omitted. Thus, no turning movement will be imparted to these particular nozzle sections 69 when the racks 131 and 133 are shifted.

During the above-described movements of the nozzle sections of aligned nozzles 65, the nozzle sections 67, being revolved 360°, are returned to their original positions. The nozzle sections 69, however, are rotated through an angle of only 180° so that the sections 69 of each pair of aligned nozzles 65 merely exchange positions. That is, with the sections 69 of the nozzles 65 which are carried by the plate 29 being transferred to the plate 31, and the sections 69 of nozzles 65 carried by the plates 31 being transferred to the plate 29.

The plates 29 and 31 are now reciprocated by the cams 107 and 109 in the same manner as described above, except in opposite directions to their prior movement. As viewed in FIG. 2 the plate 29 would now be moved to the right while the plate 31 is moved to the left, with both such plates moving simultaneously a distance equal to one-half of the center-to-center spacing between the plate recesses 61 and 63. The plates 41 and 43 will also be shifted longitudinally in opposite directions relative to each other in a manner as heretofore described, with the plate 41 moving in unison with the plate 29 and the plate 43 moving concomitantly with the plate 31.

It will be noted that during this reciprocation of the plates 29 and 31, most of the nozzle sections 69 of the nozzles 65 which were heretofore paired and transferred from one of the plates 29 and 31 to the other thereof travel in the same direction relative to the common plane as they did during the prior reciprocation of such plates. More particularly, during the initial reciprocation of the plates 29 and 31, all nozzle sections 69 carried by the plate 29 were all moved to the left while all nozzle sections 69 carried by the plate 31 were all moved to the right. During the subsequent reciprocation of these plates, the plate 29 is moved to the right while the plate 31 is moved to the left. The nozzle sections 69 of paired nozzles 65 are revolved through an arc of 180° inbetween such shifts of the plates, however, so that sections 69 of such paired nozzles are merely transferred from one plate 29 and 31 to the other thereof. Thus, except for the sections 69 of the endmost nozzles 65 in each such series of nozzles, the sections 69 will be moved in the same leftward or rightward direction relative to the common plane during both of the reciprocating movements of the plates 29 and 31. The strands which are formed from the streams of strand-forming material extruded from the orifices 143 of these particular nozzle sections 69 are indicated at 145 and 147, and as shown at junction A in FIG. 4, the strand 145 overlies the strand 147.

As heretofore mentioned, the sections 69 of the endmost nozzles 65 are not turned when paired nozzles 65 in the plates 29 and 31 are revolved and therefore, remain along the same side during both of the described reciprocating movements of the plates 29 and 31. For example, the section 69 of the nozzle 65 shown at the extreme left of the plate 29 in FIG. 2 merely travels with the plate 29 when such plate is shifted to the left and subsequently to the right. This particular nozzle section 69 will be transferred to the plate 31 when paired nozzles are subsequently revolved and will thereafter travel to the right, as viewed in FIG. 2, until it again becomes part of a nozzle which is located at one end of a series of nozzles.

On the other hand, the nozzle sections 67 of the paired nozzles 65 which are returned to their original plates 29 and 31 during each 360° revolution thereof will travel, during the last-mentioned reciprocation of the plates 29 and 31, in a direction opposite to that in which they were moved during the initial reciprocation of such plates. The strands formed from the streams of strand-forming material extruded from the orifices 141 of these particular nozzle sections 67 are indicated at 151 and 153, and as shown at junction A in FIG. 4, the strands 151 and 153 are entwined about the crossing strands 145 and 147 and are also interlaced with each other as well as with the strands 145 and 147.

Following the second described reciprocation of the plates 29 and 31 relative to each other, the now paired nozzle sections 69 are each revolved by the racks 131 and 133 through only a 180° arc, with this movement being in a direction opposite to the previous revolution of paired nozzle sections 69; namely, in a counter-clockwise direction as viewed in FIG. 2. As a result, the strands formed from the streams extruded from such sections 69 are disposed as shown at junction B in FIG. 4, with a strand 145 lying beneath a crossing strand 147.

Concomitantly with the above-mentioned 180° revolution of the sections 69, the sections 67 of the paired nozzles 65 are turned through a complete 360° circle whereby strands 151 and 153 formed from streams extruded from such sections, as shown at junction B, are entwined about the crossing strands 145 and 147. As at junction A, and junction B the strands 151 and 153 are interlaced with each other and with the strands 145 and 147. It will be noted, however, that the strands 151 and 153 each bend in opposite directions at junctions A and B.

Reciprocation of the plates 29 and 31 is then effected by shifting the same in directions as initially described and is followed by revolving the paired nozzle sections 67 and the separate but mating nozzle sections 69 in clockwise directions. By repeating the above-described steps, concomitantly with the extrusion and setting of the streams of strand-forming material a continuous net-like structure is provided having strand and strand junctions as illustrated in FIG. 4.

Figure 4:
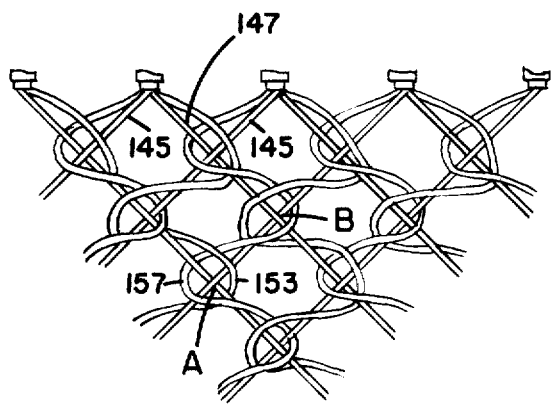
FIG. 4 is a diagrammatic illustration of a portion of one form of net-like structure made by the method of the present invention.

From the above description, and as shown in FIG. 4, strands 145 and 147 extend diagonally of the net-like structure and are interlaced with each other to provide a web having a plain weave. That is, such diagonal strands 145 and 147 extend under a crossing strand at one junction and then over a crossing strand at an adjacent junction. On the other hand, the strands 151 and 153 extend along zig-zag paths and are interlinked with each other to provide a second web. It will be further noted that the strands 145 and 147 pass over and under strands 151 and 153 of this second web at the different junctions and thus the strands of one web are interwoven with strands of the other of such strands. Of particular importance is that the strands 151 and 153, being entwined about the strands 145 and 147 at their crossing points, do restrict shifting of the strands of the woven web relative to each other.

If in the practice of the above-described method the extruded streams are brought into contact while still in a tacky condition, the resulting strands will be adhered to each other at the strand junctions. Preferably, however, the streams are at least surface set prior to contact to provide a more flexible net-like structure. Variations from the net-like structure described may be provided, for example, by reciprocating the plates 29 and 31 further multiples of the center-to-center spacing between plate recesses 61 and 63 and/or by revolving the sections 67 of the paired nozzles 65 through arcs of 360° plus further multiples of 180°. With this latter procedure, the strands 151 and 153 formed from streams extruded from the nozzle sections 67 would be twisted one or more turns about the strands 145 and 147 at their crossing points.

While the net-like structure has been described as being formed concomitantly of the manufacture of strands, net-like structures may be produced from preformed strands. In this instance, the preformed strands are merely laced through the nozzle orifices after which such strands and their supply sources are manipulated in accordance with the method of the present invention, as described above.

I claim:

1. A method of making net-like structures including the steps of delivering a plurality of separate groups of continuous strands with the groups arranged in pairs and the pairs of groups being spaced from each other a given distance along a common plane which extends between the groups of each pair of groups, revolving each pair of groups of strands about an axis which extends between the respective groups of each pair of groups with at least the strand of each such group which is nearest to its axis of revolution but less than all of the strands of each such group being moved through an angle of only 180° while the remainder of the strands in each such group are moved through an angle of 360°, relatively moving the groups of strands in a direction parallel to the common plane to rearrange at least certain of the groups of strands into pairs with other groups of strands and continuously repeating the above sequence of movements simultaneously with the continuous delivery of the groups of strands.

2. A method as defined in claim 1 wherein all strands in each pair of groups of strands are revolved in the same direction relative to the axis which extends between the respective groups of each pair of groups.

3. A method as defined in claim 2 wherein the direction of revolution of each pair of groups is reversed after each relative movement of the groups of strands in a direction parallel to the common plane.

4. A method as defined in claim 3 wherein the relative movement of the groups of strands is effected by moving at least the groups of strands located along one side of the common plane and wherein the direction of such movement is reversed after each revolution of the pairs of groups of strands.

5. A method as defined in claim 1 wherein the strands are formed by extruding the streams of strand-forming material continuously and concomitantly with the repeated sequence of movements of the groups of strands and wherein the extruded streams are set into strands prior to any contact therebetween.

6. A method as defined in claim 1 wherein the strands are formed by extruding streams of strand-forming material continuously and concomitantly with the repeated sequence of movements of the groups of strands and wherein the extruded streams are set into strands after such streams have contacted with each other.

* * * * *

PO-1050
(5/69)

UNITED STATES PATENT OFFICE
CERTIFICATE OF CORRECTION

Patent No. 3,686,380          Dated August 22, 1972

Inventor(s) Theodore H. Fairbanks

It is certified that error appears in the above-identified patent and that said Letters Patent are hereby corrected as shown below:

Front page, left column, line 5, insert "(73) Assignee: FMC Corporation, Philadelphia, Pa.". Col. 2, line 45, after "each" insert -- such --. Col. 8, line 2, after "Suitable" delete the comma (,).

Signed and sealed this 9th day of January 1973.

(SEAL)
Attest:

EDWARD M. FLETCHER, JR.
Attesting Officer

ROBERT GOTTSCHALK
Commissioner of Patents